Sept. 27, 1966      G. PFEIFER      3,275,381
FLUID PRESSURE SERVOMOTOR
Filed June 29, 1964      3 Sheets-Sheet 2
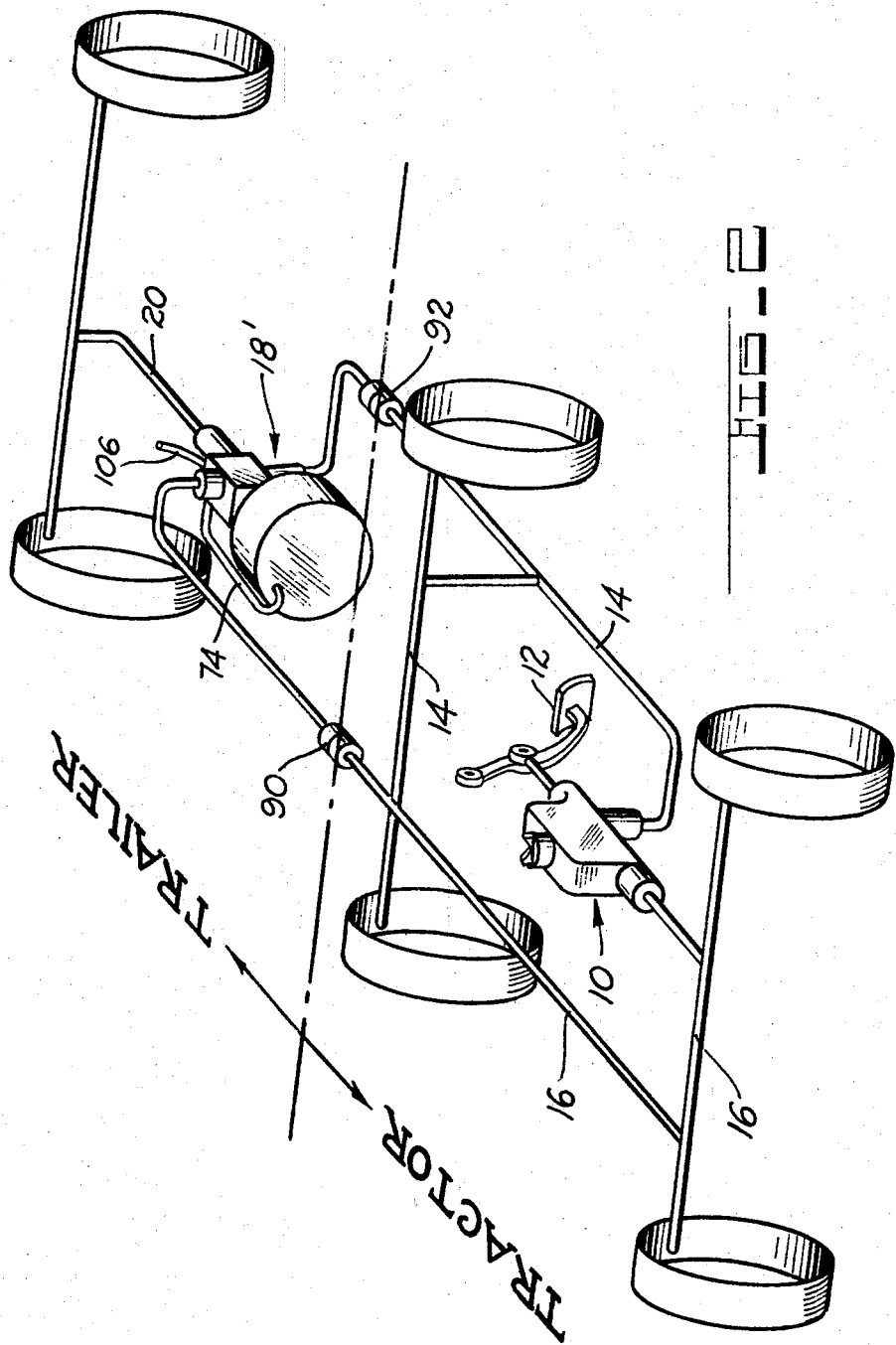
INVENTOR.
GUNTHER PFEIFER.
BY
ATTORNEY.

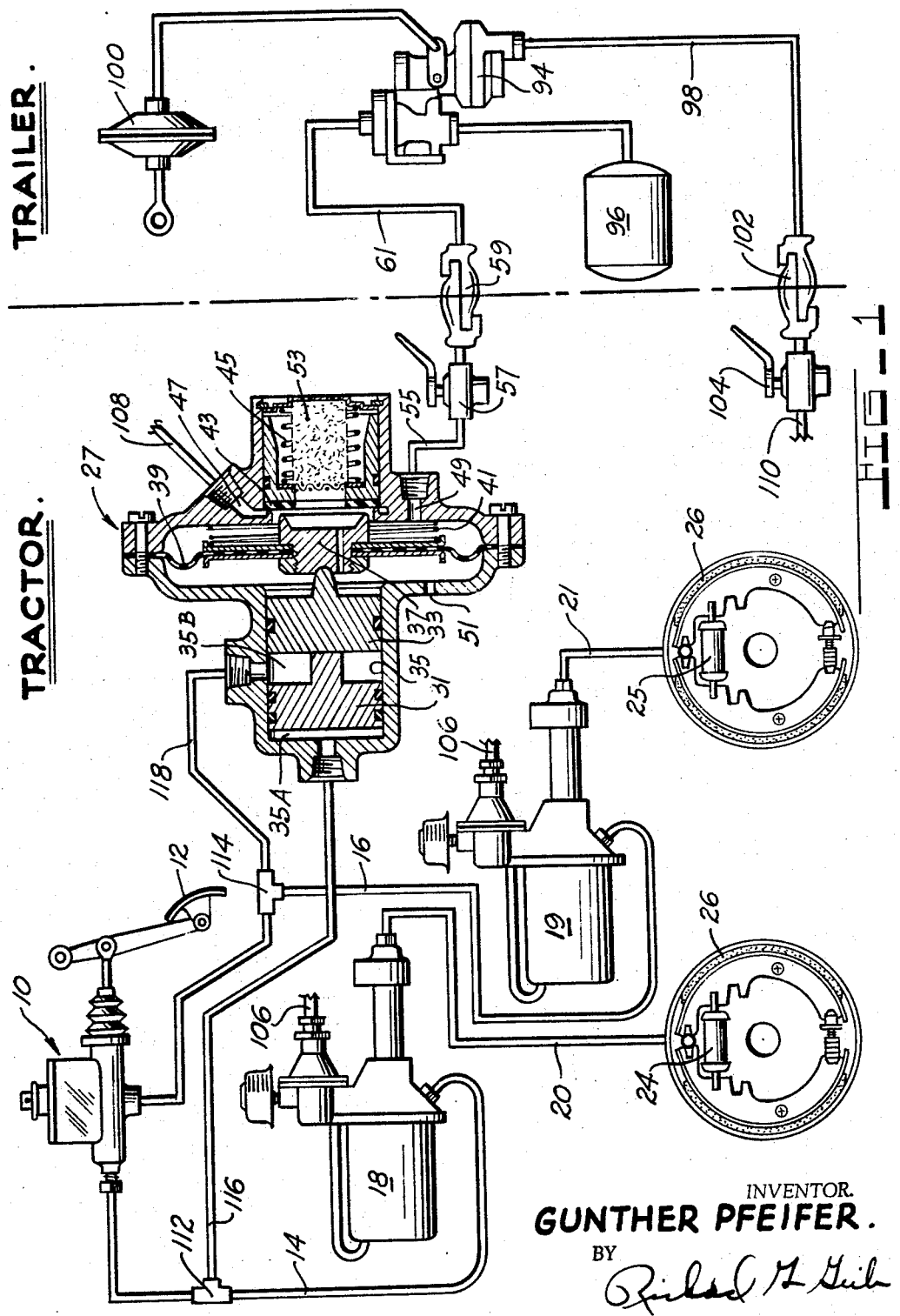

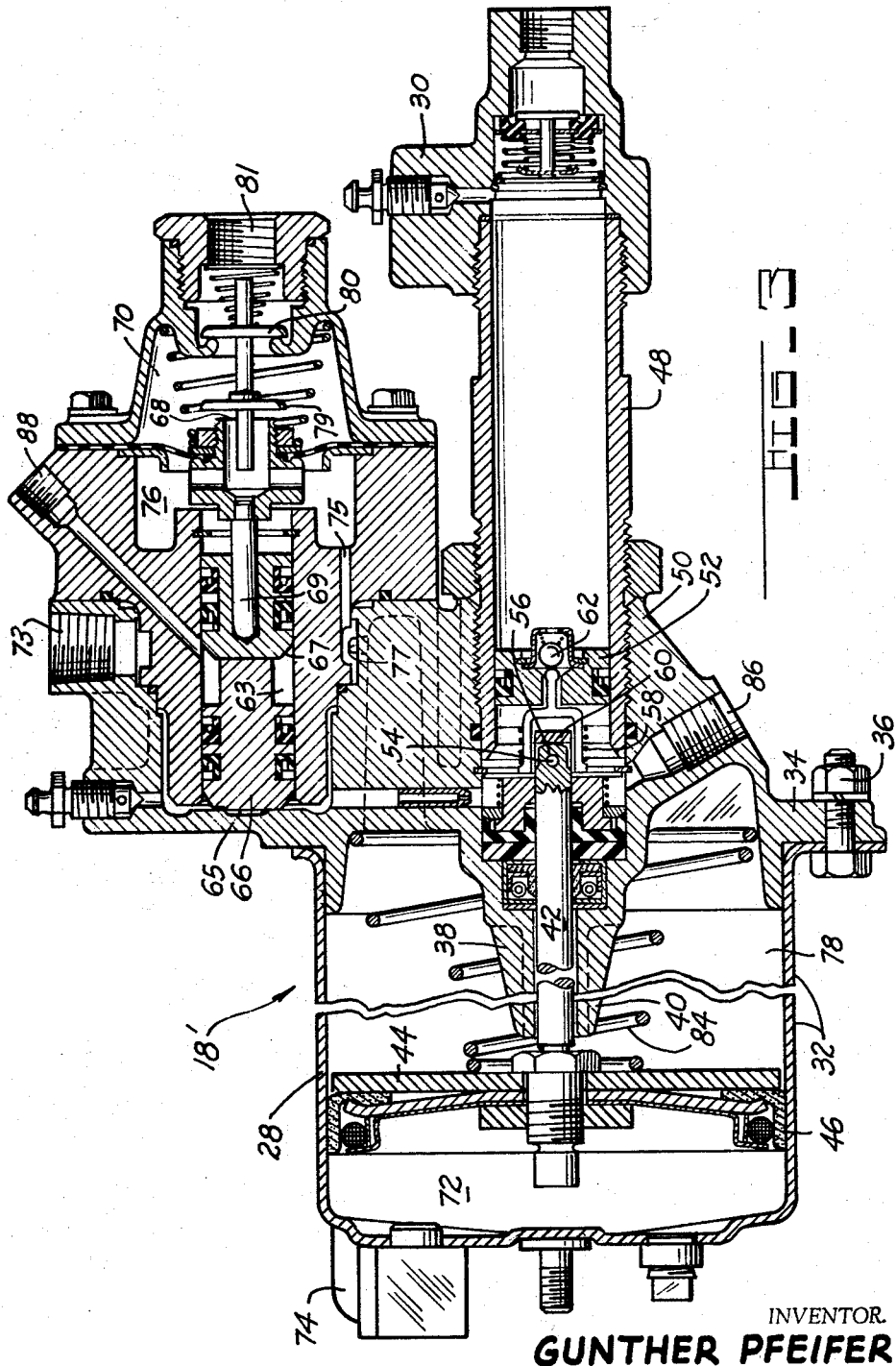

United States Patent Office 3,275,381
Patented Sept. 27, 1966

3,275,381
FLUID PRESSURE SERVOMOTOR
Gunther Pfeifer, South Bend, Ind., assignor to The Bendix Corporation, South Bend, Ind., a corporation of Delaware
Filed June 29, 1964, Ser. No. 378,600
1 Claim. (Cl. 303—7)

The present invention relates to fluid pressure servomotor control valves; and more generally to the provision of means to provide fail-safe operation thereof.

An object of the present invention is the provision of a new and improved control valve for a fluid pressure servomotor and the like that is arranged to be operated by at least two, independent means.

The invention resides in certain constructions and combinations and arrangement of parts; and further objects and advantages of the invention will become aparent to those skilled in the art to which the invention relates from the following description of the preferred embodiment described with reference to the accompanying drawing forming a part of the specification, and in which:

FIGURE 1 is a schematic view of a fluid pressure servomotor in combination with a vehicle braking system with a cross sectional view of a control valve embodying principles of my invention;

FIGURE 2 is a schematic showing another use for my invention allowing a trailer to be connected to a split vehicle brake system; and FIGURE 3 is a longitudinal cross-sectional view of the fluid pressure servomotor embodying principles of the present invention.

The vehicle brake system is shown to embody a split or dual chamber type master cylinder 10 capable of creating at least two independent pressures when actuated by a brake pedal 12, which master cylinder is hydraulically connected by means of conduits 14 and 16 to a power, or booster units 18 and 19, more commonly referred to as fluid pressure servomotors. At the outlet side, the power units are connected by means of conduits 20 and 21 to wheel cylinders, or motors, 24 and 25 which are arranged to operate brakes 26. It will, of course, be readily apparent that the assistance of the power unit can be used in any type of control system. Its usefulness is not limited to braking systems, although that constitutes its most important field at present.

Heretofore such a tractor or vehicle brake system as above described have had to have one line tapped to operate a trailer brake control valve. This would have the effect of not only requiring displacement considerations in the split master cylinder for one side only. In addition, it would not provide fail-safe operation of the trailer brakes which is an advantage of the split system that should not be eliminated.

Therefore, I have devised a control valve 27 which will allow fail-safe operation of the trailer brakes as well as the tractor's. More particularly, I have devised a valve having a first piston 31 and a second piston 33 operable in a bore 35 to move a control valve poppet 37. As seen the pistons 31 and 33 can individually or collectively move poppet 37.

The poppet 37 is held in place by a diaphragm 39 biased by a spring 41 to return the pistons 31 and 33 when the brakes are to be released. The diaphragm 39 also serves as a reaction medium to impart braking feel to the operator of the tractor-trailer vehicle, as does similar valve arrangements in the units 18 and 19. The poppet, as seen in FIGURE 1, is arranged to abut a valve seat 43 that is normally biased by a spring 45 to close off a pressure port 47 from an outlet port 49. As the poppet 37 moves to the right to abut seat 43, the atmospheric connection via bleed 51 and filtered inlet 53 is closed off from the discharge port 49. Further movement to the right of poppet 37 lifts seat 43 to communicate pressure port to discharge port 49. At this time fluid under a pressure different from atmosphere is directed to the discharge port 49 that is connected by means of a tractor service line 55 and shut-off valve 57 to a "glad-hand" coupling 59 to which a trailer service valve 61 is connected. The trailer service line is connected at the other end to an emergency relay valve 94 that is connected to a trailer reservoir 96, an emergency line 98 and a trailer brake dishpan power chamber 100.

As seen the emergency line is communicated to a second "glad-hand" coupler 102 leading to a shut-off valve 104 in the tractor. The emergency relay valve is of the type to have means to automatically actuate applicator 100 upon a drop in air pressure, as is familiar to those skilled in the art to which my invention relates.

The power chambers 18 and 19, the valve 27 and the shut-off valve 104 are connected, respectively, to an air pressure source by conduits 106, 108 and 110.

In operation, the tractor vehicle operator depresses brake pedal 12 to actuate the control valves of units 18 and 19 and by means of T connections 112 and 114 in lines 14 and 16, he simultaneously pressurizes chambers 35A and 35B with hydraulic pressure from conduits 116 and 118, respectively.

In FIGURE 2, I show the split master cylinder 10 for a vehicle which has a pair of quick disconnects 90 and 92 to adapt the vehicle to hook-up to a trailer portion having a separate brake system employing a booster unit 18′ such as is shown in cross section in FIGURE 3.

This power unit 18′ comprises a power cylinder 28 and a hydraulic cylinder 30. The power cylinder 28 may be of any preferred type, i.e., it may utilize whatever source of power is available. In the illustrated version of the invention, the power cylinder is of the differential air pressure type, and is specifically a compressed air power cylinder, in which the pressure differential across the piston is provided by having air at atmospheric pressure on one side of the piston and air at super-atmospheric pressure on the other side of the piston.

As seen in FIGURE 3, the power cylinder casing consists of a cup-shaped shell 32 and a die cast end plate 34 secured to the open end of the shell by means of a plurality of fastening members 36. The end plate has an integral, annular guide boss 38 which extends into the interior of the shell 32. The guide boss provides a relatively long interior bearing surface 40, which constitutes a bearing support surface for a thrust rod 42. A power piston 44, which is reciprocably mounted in shell 32, has an integral, annular seal 46 of leather or similar construction to separate the shell 32 into two, variable volume chambers.

The hydraulic cylinder 30 comprises a tube 48 threaded into a boss 50 on the end plate 34. A piston 52 is reciprocably mounted in the hydraulic cylinder, and is connected to one end of the thrust rod 42 by means of a lost motion pin-and-slot connection, constituted by a pin 54 which extends through a slightly oversized hole 56 in the end of the rod. The pin is loosely carried in a laterally extending opening in the rear portion of the piston 52, in which it is held by means of a retainer 58. The thrust exerted by rod 42 against the hydraulic piston 52 is not carried by pin 54, but instead is exerted directly against a hardened thrust element 60, which is embedded in the rear of the piston.

Piston 52 and the several elements which control the seating and unseating of a ball valve 62 are described in detail, and certain novel features thereof are claimed in application Serial No. 620,905 filed by Evue J. Ringer on October 8, 1945, now Patent No. 2,598,604.

In order to control the piston 44 I have provided a fail-safe control valve operated by a pair of pistons 66 and 67 reciprocably mounted in a bore in the die cast end plate 34. As seen, these pistons are in abutment with each other such that a chamber 63 is prescribed between the pistons; whereas a chamber 65 is formed between the end of piston 66 and the end of the bore in the die cast end plate 34. The piston 67 is connected to a valve seat 68 by means of a thrust transmitting rod 69 such that pressure in either chambers 63 and/or 65 will cause pistons 66 and/or 67, respectively, to urge the valve seat 68 toward the right. A chamber 70 of the control valve communicates with the variable volume chamber 72 of the power cylinder 28 through a pipe 74, and, as long as the other variable volume chamber 78 connected to valve chamber 76, is open to atmosphere by means of passages 75 and port 73 plus passage 77 leading to chamber 78, there is no pressure differential over power piston 44, chamber 78 being open to air at atmospheric pressure by means of passage 77. When piston 66 and/or 67 are moved toward the right end of the control valve, valve seat 68 first engages valve element 79 to disconnect chambers 70 and 76, and thereafter unseats valve element 80 to admit compressed air supplied to port 81 by means of a pump (not shown) to admit compressed air to chamber 70 and by means of pipe 74 to chamber 72.

A spring 84, located in power chamber 78, serves to return power piston 44 to the released position shown, after a power stroke of the piston. The integral relationship of the thrust rod 42 and the piston 44 would thus cause returning of the hydraulic piston 52 to the released position shown, by pulling on the pin 54.

It will thus be seen that as the operator of a vehicle depicted by FIGURE 2 depresses the brake pedal 12 he will simultaneously direct two hydraulic fluid columns by means of conduits 14 and 16 to ports 86 and 88 respectively for the fluid pressure servomotor to pressurize chambers 63 and 65 to actuate the valve seat 68, as aforementioned.

It will thus be realized that failure of either of the hydraulic fluid columns as by rupturing one or other of the lines 14 or 16 would not have any disastrous effect upon operation of the control valve for the fluid pressure servomotor.

Although a particular embodiment of my invention has been described, it will be understood by those skilled in the art that the objects of the invention may be attained by the use of constructions different in certain respects from that disclosed without departing from the underlying principles of the invention.

I claim:

In a tractor-trailer brake system including a split master cylinder, a pair of fluid pressure servomotors independently connected to said master cylinder such that one portion of said master cylinder operates one servomotor and another portion of said master cylinder operates another one of said servomotors, the improvement of a control valve for operating a relay valve of the trailer brake system which control valve comprises:

a valve seat;
a valve poppet means normally in spaced relation from said valve seat;
a first piston means for moving said valve seat to contact said valve poppet means; and
a second piston means operatively connected to said first piston means for moving said valve seat to contact said valve poppet means such that pressure on one or both of said first and second piston means will operate said control valve.

References Cited by the Examiner

UNITED STATES PATENTS

| | | | |
|---|---|---|---|
| 2,041,884 | 5/1936 | Vorech et al. | 303—13 |
| 2,429,194 | 10/1947 | Price | 303—7 |
| 2,989,974 | 6/1961 | Blair | 137—113 |

FOREIGN PATENTS

| | | |
|---|---|---|
| 611,657 | 10/1960 | Italy. |
| 1,133,264 | 7/1962 | Germany. |
| 835,970 | 5/1960 | Great Britain. |

EUGENE G. BOTZ, *Primary Examiner.*

M. S. SALES, *Assistant Examiner.*